(12) United States Patent
Watanabe et al.

(10) Patent No.: US 7,216,028 B2
(45) Date of Patent: May 8, 2007

(54) CONTROL APPARATUS AND CONTROL METHOD FOR VEHICLE ENGINE SYSTEM

(75) Inventors: Satoru Watanabe, Isesaki (JP); Hajime Hosoya, Isesaki (JP); Yutaka Ogiwara, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 230 days.

(21) Appl. No.: 11/001,080

(22) Filed: Dec. 2, 2004

(65) Prior Publication Data

US 2005/0121977 A1 Jun. 9, 2005

(30) Foreign Application Priority Data

Dec. 3, 2003 (JP) .............................. 2003-404079

(51) Int. Cl.
*B60R 25/04* (2006.01)
*F02M 37/04* (2006.01)
*G01M 15/00* (2006.01)

(52) U.S. Cl. ..................... 701/102; 73/118.1; 123/480; 123/520

(58) Field of Classification Search ................ 701/102, 701/103, 105, 114, 115; 123/519, 520, 478, 123/480; 73/118.1, 116
See application file for complete search history.

(56) References Cited

U.S. PATENT DOCUMENTS

| | | | |
|---|---|---|---|
| 5,752,490 A * | 5/1998 | Rodgers et al. ............. | 123/497 |
| 6,253,742 B1 * | 7/2001 | Wickman et al. ........... | 123/516 |
| 6,588,449 B1 * | 7/2003 | Kippe ........................ | 137/399 |
| 6,935,317 B2 * | 8/2005 | Wiesenberger et al. ..... | 701/114 |
| 2005/0139197 A1 * | 6/2005 | Ohhashi et al. ............. | 123/520 |

FOREIGN PATENT DOCUMENTS

| JP | 7-91330 A | 4/1995 |
|---|---|---|
| JP | 2003-127832 A * | 5/2003 |

* cited by examiner

*Primary Examiner*—Hieu T. Vo
(74) *Attorney, Agent, or Firm*—Foley & Lardner LLP

(57) ABSTRACT

An engine control unit that controls an engine and a fuel supply control unit that controls a fuel supply apparatus are disposed separately, and the antitheft process is performed individually by the respective control units.

18 Claims, 2 Drawing Sheets

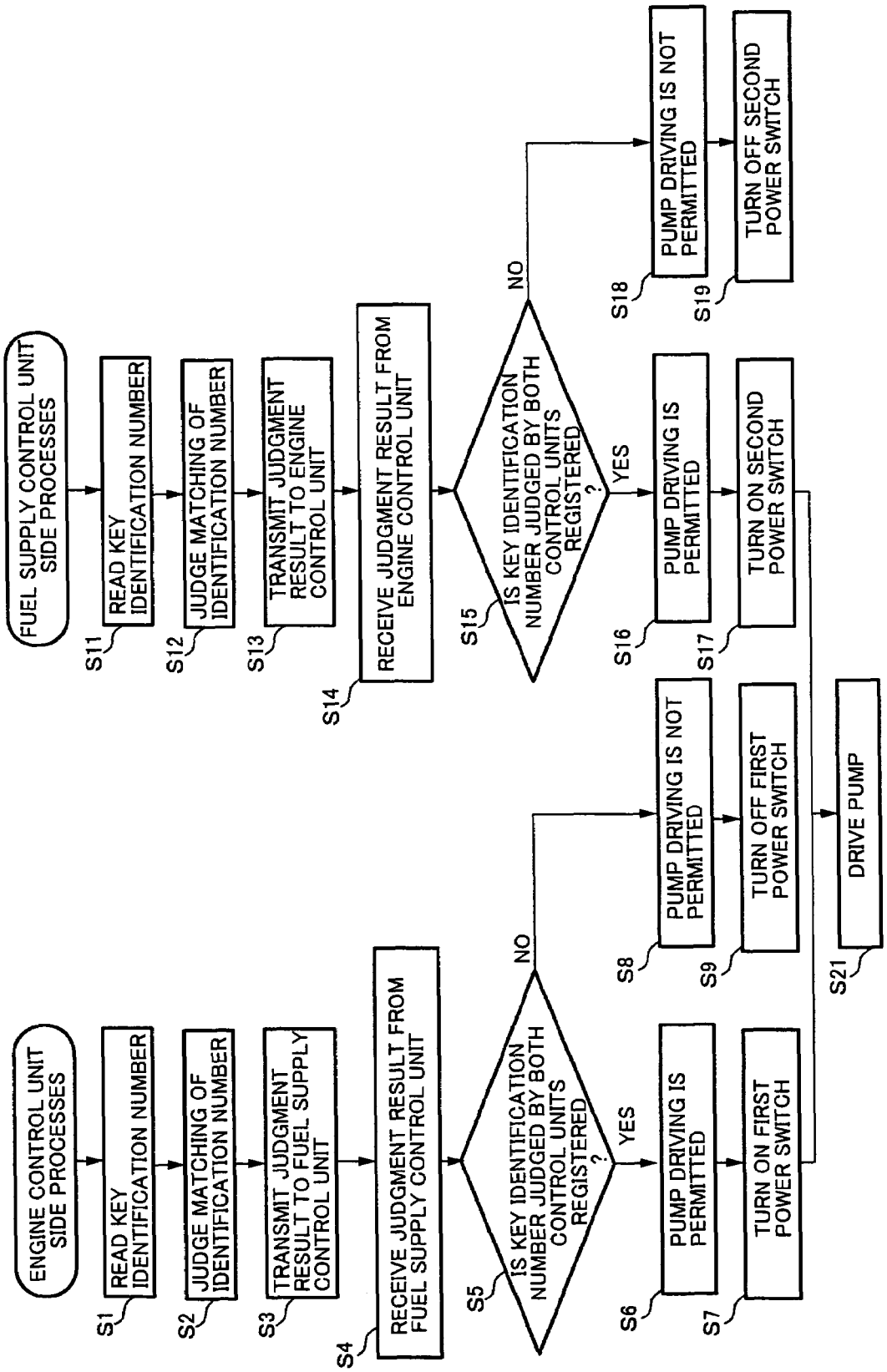

CONTROL APPARATUS AND CONTROL METHOD FOR VEHICLE ENGINE SYSTEM

BACKGROUND OF THE INVENTION

1. Field of the Invention

The present invention relates to a control apparatus and a control method for a vehicle engine system provided with an engine and a fuel supply apparatus which supplies fuel to the engine.

2. Description of the Related Art

In a vehicle engine system disclosed in Japanese Unexamined Patent Publication No. 7-091330, an engine and a fuel supply apparatus which supplies fuel to the engine, are controlled by a single control unit.

The fuel supply apparatus includes a fuel vapor purge system in addition to a fuel pump.

However, in the case where the engine and the fuel supply apparatus are controlled by the single control unit as described above, even though the engine is common, if the specifications of the fuel supply apparatus are different to each other, there is caused the necessity of partly modifying the control logic of the control unit.

Therefore, even though the engine is common, there is a problem in that the control unit needs to be set for each specification of the fuel supply apparatus which is combined with the engine.

Further, in the case where the engine and the fuel supply apparatus are controlled by the signal control unit, sensors and control objects included in the engine and the fuel supply apparatus, respectively, need to be connected individually to the signal control unit. Therefore, there is a problem in that the total length of harness becomes longer, the cost is increased and the weight of the vehicle is increased.

SUMMARY OF THE INVENTION

The present invention has an object to provide a control apparatus and a control method for a vehicle engine system, capable of promoting the common use of a control unit, and also capable of reducing the total length of harness to achieve the reduction of cost and weight.

In order to achieve the above object, according to the present invention, separately from an engine control unit that controls an engine, a fuel supply control unit that controls a fuel supply apparatus is disposed.

The other objects and features of this invention will become understood from the following description with reference to the accompanying drawings.

BRIEF EXPLANATION OF THE DRAWINGS

FIG. 2 is a flowchart showing the antitheft process in the embodiment.

DESCRIPTION OF EMBODIMENTS

Figure 1:
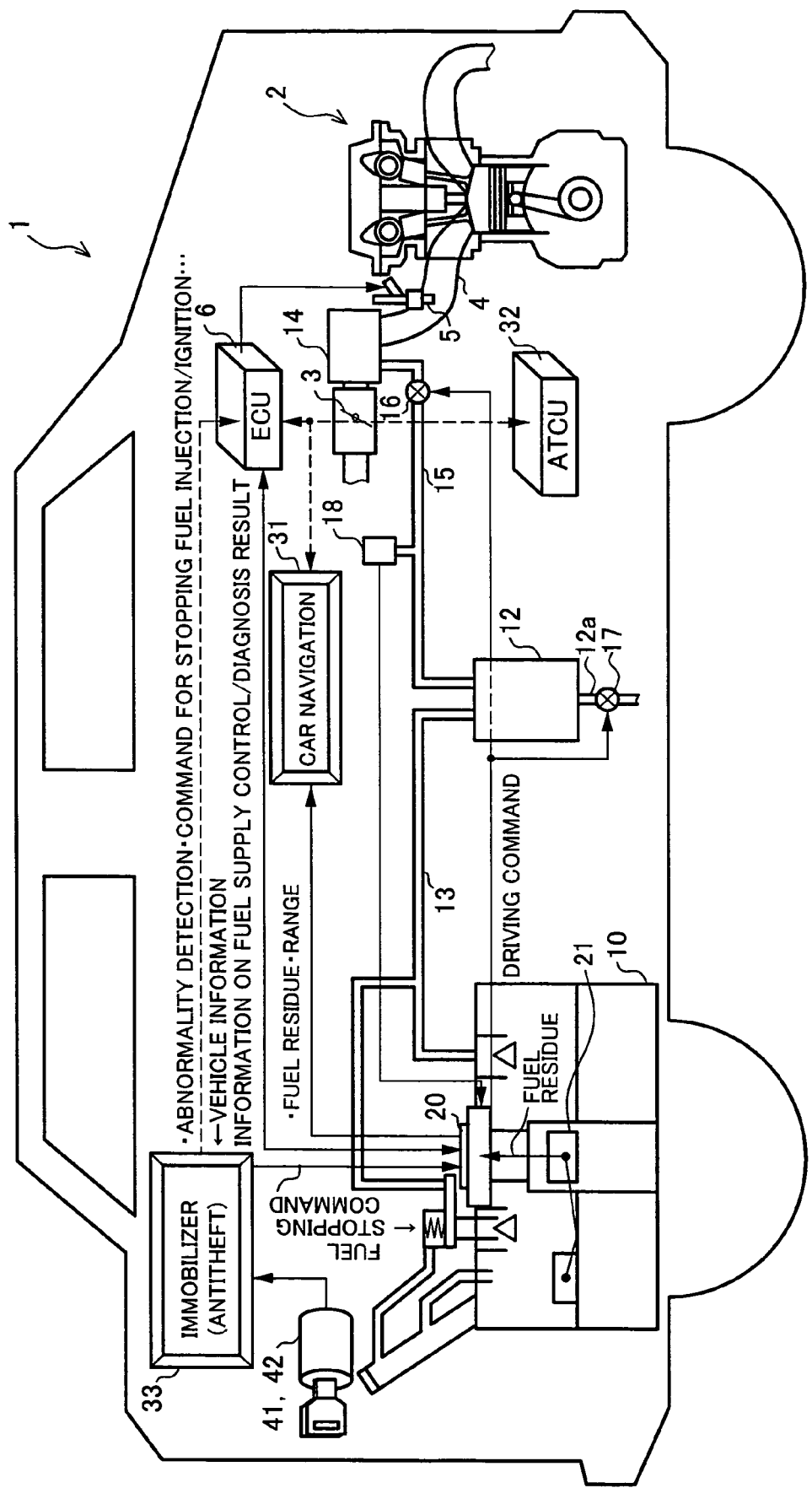
FIG. 1 is a block diagram of a vehicle engine system in an embodiment.

FIG. 1 shows a block diagram of a vehicle engine system.

A four-cycle gasoline engine 2 is installed in a vehicle 1 as a power source.

Engine 2 is supplied with air via a throttle valve 3, and also fuel is injected to engine 2 from a fuel injection valve 5 disposed to each branch portion 4 of an intake manifold.

Fuel injection valve 5 is opened according to an injection pulse signal output from an engine control unit 6 for controlling the engine, which incorporates therein a microcomputer.

Engine control unit 6 receives detection signals from an air flow meter, a crank angle sensor, a water temperature sensor and the like (not shown in the figure), and based on the calculation process of these detection signals, calculates the fuel injection timing and a fuel injection quantity of fuel injection valve 5.

Then, engine control unit 6 controls the output timing and pulse width of the injection pulse signal according to the fuel injection timing and the fuel injection quantity.

The fuel in a fuel tank 10 is sent under pressure to fuel injection valve 5 by a fuel pump 11 disposed in fuel tank 10.

Further, there is disposed a fuel vapor purge system for treating the fuel vapor generated in fuel tank 10.

The fuel vapor purge system comprises a canister 12 which is a container filled with the adsorbent such as activated carbon, an evaporation passage 13 communicating canister 12 with the inside of fuel tank 10, a purge passage 15 communicating canister 12 with an intake air collector section 14, a purge control valve 16 disposed to purge passage 15, a drain cut valve 17 disposed to a new air inlet 12a of canister 12, and a pressure sensor 18 detecting a pressure in purge passage 15 between purge control valve 16 and canister 12.

In the fuel vapor purge system, the fuel vapor generated in fuel tank 10 passes through evaporation passage 13, to be adsorbed to the adsorbent in canister 12.

Here, if a purge permission condition is established during an operation of engine 2, purge control valve 16 is controlled to open. Then, as a result that an intake negative pressure of engine 2 acts on canister 12, the fuel vapor adsorbed to canister 12 is detached by the fresh air introduced through new air inlet 12a.

Then, purged gas inclusive of the detached fuel vapor passes through purge passage 15 to be sucked into intake air collector section 14, and thereafter, is burned within a combustion chamber of engine 2.

Further, drain cut valve 17 and pressure sensor 18 are disposed for diagnosing whether or not the leakage occurs in each of evaporation passage 13 and purge passage 15.

Namely, when purge control valve 16 and drain cut valve 17 are closed, since the upstream side of purge control valve 16 becomes a shielded space, the intake negative pressure of engine 2 is trapped in the shielded space or the shielded space is pressurized or depressurized by an air pump. Then, it is judged whether or not the leakage occurs, based on a pressure in the shielded space detected by pressure sensor 18 at the time.

To be specific, in the case where the pressure higher than the atmospheric pressure or the pressure lower than the atmospheric pressure is trapped in the shielded space, when the pressure is released promptly, it is diagnosed that the leakage occurs. Further, when a change in pressure for when the shielded space is pressurized or depressurized is late or when the pressure in the shielded space does not reach a predetermined pressure, it is diagnosed that the leakage occurs.

Here, a fuel supply control unit 20 that controls a fuel supply apparatus inclusive of fuel pump 11 and the fuel vapor purge system, is disposed separately from engine control unit 6.

Fuel supply control unit 20 incorporating therein a microcomputer is attached integrally to a lid of fuel tank 10.

The lid of fuel tank 10 closes an insertion opening of fuel pump 11, and fuel pump 11 is hung from the lid.

Note, fuel supply control unit 20 may be attached to the inside of fuel tank 10 or the outer peripheral wall of fuel tank 10.

Fuel supply control unit 20 receives a detection signal from pressure sensor 18 and also a detection signal from a fuel level sensor 21 detecting a fuel level (fuel residue) in fuel tank 10.

Further, fuel supply control unit 20 is constituted to be capable of intercommunicating with engine control unit 6, and therefore, receives vehicle information transmitted from engine control unit 6.

The vehicle information includes an engine load, an engine rotation speed, a cooling water temperature, a vehicle speed, a running distance and the like.

Then, fuel supply control unit 20 outputs driving commands to purge control valve 16, drain cut valve 17 and fuel pump 11, according to the calculation process based on the vehicle information, to perform a purge control, the leakage diagnosis and a fuel pump control.

Further, fuel supply control unit 20 outputs information on a fuel supply control and the leakage diagnosis result to engine control unit 6.

Moreover, fuel supply control unit 20 detects the fuel level based on a detection signal from fuel level sensor 21, and further calculates a range based on this fuel level and the running distance input from engine control unit 6. Then, fuel supply control unit 20 outputs information on the fuel level and the range to a navigation system 31 installed in vehicle 1.

Engine control unit 6 is constituted to be capable of intercommunicating with fuel supply control unit 20 as described above, and is also constituted to be capable of intercommunicating with navigation system 31 and an automatic transmission control unit 32 that controls an automatic transmission.

According to the above constitution, even though the specifications of the fuel supply apparatus are different to each other, if the engine is common, it is possible to cope with such differences only by modifying the components and control logic of fuel supply control unit 20 and therefore, it is possible to use commonly engine control unit 6.

Further, by disposing fuel supply control unit 20 in the vicinity of the fuel supply apparatus, it is possible to reduce the total length of harness which connects the fuel supply apparatus and fuel supply control unit 20.

Further, in the present embodiment, engine control unit 6 and fuel supply control unit 20 cooperates with each other, to achieve the vehicle antitheft.

In the present embodiment, an engine immobilizer 33 is disposed as a vehicle antitheft apparatus.

Engine immobilizer 33 receives an identification number signal from a reading apparatus 42 which reads an identification number (ID number) of an ignition key inserted into a key cylinder 41. Then, if the operation start of engine 2 is attempted with an ignition key whose identification number is other than a previously registered identification number, engine immobilizer 33 stops the fuel supply to engine 2 to prevent the operation start of engine 2.

Here, engine immobilizer 33 outputs to both of engine control unit 6 and fuel supply control unit 20 a command for stopping the fuel supply to engine 2 to prevent the operation start of engine 2.

Then, fuel supply control unit 20 received the fuel supply stop command stops an operation of fuel pump 11.

On the other hand, engine control unit 6 received the fuel supply stop command stops the fuel injection by fuel injection valve 5 and also stops the ignition by an ignition plug.

Accordingly, for example, even if engine control unit 6 does not execute the process of stopping the fuel injection and the ignition in response to the fuel supply stop command from engine immobilizer 33, since fuel supply control unit 20 stops the operation of fuel pump 11, it is possible to achieve the vehicle antitheft.

Further, as shown in a flowchart of FIG. 2, the function as engine immobilizer 33 can be realized by both of engine control unit 6 and fuel supply control unit 20.

In the flowchart of FIG. 2, steps S1 to S9 shows the processes in engine control unit 6.

In step S1, the identification number of the ignition key inserted into the key cylinder is read.

In step S2, it is judged whether or not the read identification number is the previously registered identification number.

Then, in step S3, the judgment result in step S2 is transmitted to fuel supply control unit 20.

Further, in step S4, the judgment result of the identification number in fuel supply control unit 20 is received.

In step S5, it is judged whether or not it is judged by both of engine control unit 6 and fuel supply control unit 20 that the identification number of the ignition key inserted into the key cylinder is coincident with the previously registered identification number.

Here, if it is judged by both of engine control unit 6 and fuel supply control unit 20 that the ignition key having the registered identification number is used, control proceeds to step S6, where the fuel pump is permitted to be driven, and then in next step S7, a first power switch of fuel pump 11 is turned ON.

However, if it is judged by at least one of engine control unit 6 and fuel supply control unit 20 that the ignition key having the registered identification number is not used, control proceeds to step S8, where the fuel pump is not permitted to be driven, and then in next step S9, the first power switch is turned OFF.

On the other hand, in fuel supply control unit 20, the processes of steps S11 to S19 are executed.

In step S11, the identification number of the ignition key inserted into the key cylinder is read.

In step S12, it is judged whether or not the read identification number is coincident with the previously registered identification number.

Then, in step S13, the judgment result of the identification number in fuel supply control unit 20 is transmitted to engine control unit 6.

Further, in step S14, the judgment result of the identification number in engine control unit 6 is received.

In step S15, it is judged whether or not it is judged by both of engine control unit 6 and fuel supply control unit 20 that the identification number of the ignition key inserted into the key cylinder is coincident with the previously registered identification number.

Here, if it is judged by both of engine control unit 6 and fuel supply control unit 20 that the ignition key having the registered identification number is used, control proceeds to step S16, where the fuel pump is permitted to be driven, and then in next step S17, a second power switch of fuel pump 11 is turned ON.

However, if it is judged by at least one of engine control unit 6 and fuel supply control unit 20 that the ignition key having the registered identification number is not used, control proceeds to step S18, where the fuel pump is not permitted to be driven, and then in next step S19, the second power switch is turned OFF.

The first and second power switches are disposed in series to a power supply circuit of fuel pump 11. When both of the first and second power switches are controlled to turn ON, the power is supplied to fuel pump 11 so that the fuel supply to fuel injection valve 5 is performed (step S21).

On the other hand, if it is judged by at least one of engine control unit 6 and fuel supply control unit 20 that the ignition key having the registered identification number is not used and at least one of the first and second power switches is turned OFF, the power supply to fuel pump 11 is shut off so that the fuel supply to fuel injection valve 5 is stopped.

Thus, only when it is doubly checked by both of engine control unit 6 and fuel supply control unit 20 whether or not the identification number of the ignition key inserted into the key cylinder is coincident with the registered identification number, and it is judged by both of engine control unit 6 and fuel supply control unit 20 that the ignition key having the registered identification number is used, the power supply to fuel pump 11 is permitted so that the operation of engine 2 can be started.

Accordingly, for example, even in the case where an authorized action, such as the exchange of engine control unit 6 and the like, is performed, the engine operation start can be prevented by fuel supply control unit 20, thereby enabling more reliably the vehicle antitheft.

Note, instead of intercommunicating the judgment result as to whether or not the identification number of the ignition key is coincident with the registered identification number between engine control unit 6 and fuel supply control unit 20, the constitution may be such that, when it is judged by engine control unit 6 that the identification number of the ignition key is coincident with the registered identification number, the first power switch is turned ON, and when it is judged by fuel supply control unit 20 that the identification number of the ignition key is coincident with the registered identification number, the second power switch is turned ON.

Further, the constitution may be such that a single power switch is disposed, and this single power switch is turned ON based on the logical product of driving permission signals of engine control unit 6 and fuel supply control unit 20.

Moreover, the constitution may be such that, instead of the ON/OFF controls of the first and second power switches, engine control unit 6 stops the injection by fuel injection valve 5 and the ignition by the ignition plug when the identification number of the ignition key is not coincident with the registered identification number, and fuel supply control unit 20 stops the driving of fuel pump 11 when the identification number of the ignition key is not coincident with the registered identification number.

"Time when the identification number of the ignition key is not coincident with the registered identification number" in the control specification for stopping the operations of the ignition plug and the fuel pump, includes the case where it is judged based on the own judgment of engine control unit 6 or fuel supply control unit 20 that the identification number of the ignition key is not coincident with the registered identification number, and the case where it is judged by at least one of engine control unit 6 and fuel supply control unit 20 that the identification number of the ignition key is not coincident with the registered identification number.

The entire contents of Japanese Patent Application No. 2003-404079 filed on Dec. 3, 2003, a priority of which is claimed, are incorporated herein by reference.

While only a selected embodiment has been chosen to illustrate the present invention, it will be apparent to those skilled in the art from this disclosure that various changes and modifications can be made herein without departing from the scope of the invention as defined in the appended claims.

Furthermore, the foregoing description of the embodiment according to the present invention is provided for illustration only, and not for the purpose of limiting the invention as defined in the appended claims and their equivalents.

We claim:

1. A control apparatus for a vehicle engine system provided with an engine and a fuel supply apparatus which supplies fuel to said engine, comprising:

an engine control unit that controls said engine;

a fuel supply control unit that is disposed separately from said engine control unit and controls said fuel supply apparatus;

a fuel level sensor detecting a fuel level in a fuel tank; and a navigation system, wherein said fuel supply control unit receives a running distance signal from said engine control unit and also receives a fuel level signal from said fuel level sensor to calculate a range based on said running distance signal and said fuel level signal, to output a range signal and said fuel level signal to said navigation system.

2. A control apparatus for a vehicle engine system according to claim 1, wherein said fuel supply apparatus includes a fuel vapor purge system, and said fuel supply control unit controls said fuel vapor purge system and also diagnoses whether or not the leakage occurs in said fuel vapor purge system, to output to said engine control unit a diagnosis signal indicating whether or not the leakage occurs.

3. A control apparatus for a vehicle engine system provided with an engine and a fuel supply apparatus which supplies fuel to said engine, comprising:

an engine control unit that controls said engine;

a fuel supply control unit that is disposed separately from said engine control unit and controls said fuel supply apparatus; and a theft detection apparatus outputting a vehicle theft detection signal, wherein said engine control unit and said fuel supply control unit individually execute the process of inhibiting the operation start of said engine based on said vehicle theft detection signal.

4. A control apparatus for a vehicle engine system according to claim 3, wherein said engine includes a fuel injection valve and an ignition plug; and said engine control unit stops the fuel injection by said fuel injection valve and also stops the ignition by said ignition plug, based on said vehicle theft detection signal, and also said fuel supply apparatus includes an electric fuel pump; and said fuel supply control unit stops an operation of said fuel pump, based on said vehicle theft detection signal.

5. A control apparatus for a vehicle engine system according to claim 3, wherein said fuel supply apparatus includes a fuel vapor purge system, and said fuel supply control unit controls said fuel vapor purge system and also diagnoses whether or not a leakage occurs in said fuel vapor purge system, to output to said engine control unit a diagnosis signal indicating whether or not the leakage occurs.

6. A control apparatus for a vehicle engine system provided with an engine and a fuel supply apparatus which supplies fuel to said engine, comprising:

an engine control unit that controls said engine;

a fuel supply control unit that is disposed separately from said engine control unit and controls said fuel supply apparatus; and a reading apparatus reading an identification number of an ignition key which is inserted into a key cylinder, wherein said engine control unit and said fuel supply control unit each receive an identification number signal from said reading apparatus, to individually judge whether or not the identification number read by said reading apparatus is previously registered, and when it is judged that the read identification number is not previously registered, execute individually the process of inhibiting the operation start of said engine.

7. A control apparatus for a vehicle engine system according to claim 6, wherein said engine control unit and said fuel supply control unit mutually transmit judgment signals of said identification number, and only when it is judged by both of said engine control unit and said fuel supply control unit that said identification number is previously registered, said engine control unit and said fuel supply control unit permit the operation start of said engine.

8. A control apparatus for a vehicle engine system according to claim 6, wherein said fuel supply apparatus includes an electric fuel pump, a first switch controlled by said engine control unit and a second switch controlled by said fuel supply control unit are disposed in series to a power supply circuit of said fuel pump, said engine control unit controls said first switch to turn OFF, to inhibit the operation start of said engine, and said fuel supply control unit controls said second switch to turn OFF, to inhibit the operation start of said engine.

9. A control apparatus for a vehicle engine system according to claim 6, wherein said fuel supply apparatus includes a fuel vapor purge system, and said fuel supply control unit controls said fuel vapor purge system and also diagnoses whether or not a leakage occurs in said fuel vapor purge system, to output to said engine control unit a diagnosis signal indicating whether or not the leakage occurs.

10. A control method for a vehicle engine system provided with an engine and a fuel supply apparatus which supplies fuel to said engine, comprising the steps of:

controlling said engine by an engine control unit;

controlling said fuel supply apparatus by a fuel supply control unit that is disposed separately from said engine control unit;

receiving by said fuel supply control unit a vehicle running distance signal and a fuel level signal in a fuel tank;

calculating by said fuel supply control unit a range based on said vehicle running distance signal and said fuel level signal; and outputting a range signal and said fuel level signal to the outside.

11. A control method for a vehicle engine system according to claim 10, wherein said fuel supply apparatus includes a fuel vapor purge system, and said step of controlling said fuel supply apparatus comprises the steps of:

controlling said fuel vapor purge system by said fuel supply control unit;

diagnosing by said fuel supply control unit whether or not the leakage occurs in said fuel vapor purge system; and outputting to said engine control unit a diagnosis signal indicating whether or not the leakage occurs.

12. A control method for a vehicle engine system provided with an engine and a fuel supply apparatus which supplies fuel to said engine, comprising the steps of:

controlling said engine by an engine control unit;

controlling said fuel supply apparatus by a fuel supply control unit that is disposed separately from said engine control unit;

receiving by each of said engine control unit and said fuel supply control unit a vehicle theft detection signal; and executing by each of said engine control unit and said fuel supply control unit the process of inhibiting the operation start of said engine based on said vehicle theft detection signal.

13. A control method for a vehicle engine system according to claim 12, wherein said engine includes a fuel injection valve and an ignition plug, and said fuel supply apparatus includes an electric fuel pump, and said step of inhibiting the operation start of said engine comprises the steps of:

stopping by said engine control unit the fuel injection by said fuel injection valve and also the ignition by said ignition plug based on said vehicle theft detection signal; and stopping by said fuel supply control unit an operation of said fuel pump based on said vehicle theft detection signal.

14. A control method for a vehicle engine system according to claim 12, wherein said fuel supply apparatus includes a fuel vapor purge system, and said step of controlling said fuel supply apparatus comprises the steps of;

controlling said fuel vapor purge system by said fuel supply control unit;

diagnosing by said fuel supply control unit whether or not a leakage occurs in said fuel vapor purge system; and outputting to said engine control unit a diagnosis signal indicating whether or not the leakage occurs.

15. A control method for a vehicle engine system provided with an engine and a fuel supply apparatus which supplies fuel to said engine, comprising the steps of:

controlling said engine by an engine control unit;

controlling said fuel supply apparatus by a fuel supply control unit that is disposed separately from said engine control unit;

receiving by each of said engine control unit and said fuel supply control unit an identification number signal of an ignition key which is inserted into a key cylinder;

judging individually by said engine control unit and said fuel supply control unit whether or not said identification number is previously registered;

executing by said engine control unit the process of inhibiting the operation start of said engine when judging that said identification number is not previously registered; and executing by said fuel supply control unit the process of inhibiting the operation start of said engine when judging that said identification number is not previously registered, separately from the process by said engine control unit.

16. A control method for a vehicle engine system according to claim 15, wherein said step of inhibiting the operation start of said engine comprises the steps of:

mutually transmitting by said engine control unit and said fuel supply control unit judgment signals of said identification number; and only when it is judged by both of said engine control unit and said fuel supply control unit that said identification number is previously registered, permitting by said engine control unit and said fuel supply control unit the operation start of said engine.

17. A control method for a vehicle engine system according to claim 15, wherein said fuel supply apparatus includes an electric fuel pump, and said step of inhibiting the operation start of said engine comprises the steps of:

shutting off a power supply circuit of said fuel pump by said engine control unit when judging that said identification number is not previously registered; and shutting off the power supply circuit of said fuel pump by said fuel supply control unit when judging that said identification number is not previously registered.

18. A control method for a vehicle engine system according to claim 15, wherein said fuel supply apparatus includes a fuel vapor purge system, and said step of controlling said fuel supply apparatus comprises the steps of:

controlling said fuel vapor purge system by said fuel supply control unit;

diagnosing by said fuel supply control unit whether or not a leakage occurs in said fuel vapor purge system; and outputting to said engine control unit a diagnosis signal indicating whether or not the leakage occurs.

* * * * *